Feb. 16, 1960   H. BUCHMAN   2,924,849
TRAY FOR MAKING A CORRECTIVE FOOT-MOLDED APPLIANCE
Filed Aug. 16, 1956   2 Sheets-Sheet 1

INVENTOR.
HENRY BUCHMAN
BY
ATTORNEY

INVENTOR.
HENRY BUCHMAN
BY
ATTORNEY

United States Patent Office 2,924,849
Patented Feb. 16, 1960

2,924,849

TRAY FOR MAKING A CORRECTIVE FOOT-MOLDED APPLIANCE

Henry Buchman, Rochester, N.Y.

Application August 16, 1956, Serial No. 604,389

3 Claims. (Cl. 18—5.1)

The present invention relates to shoes, and more particularly to shoes for the accommodation and corrective treatment of foot ailments.

One way in which corrective foot appliances have been made heretofore has been first to make a negative impression of a patient's foot either by a plaster of Paris cast or by use of plaster of Paris bandages. From the plaster of Paris impression a positive mold (duplicate of the patient's foot) has been made in plaster of Paris. This mold has then had to be modified or corrected for excrescenses on the patient's foot, and has had to be smoothed so that there are no irregularities or ridges or pockets in it. Then a mixture of liquid latex and cork dust, or wood flour, has been spatulated on the positive mold. Then, to make sure that the appliance is thin at the heel and at the ball of the foot, the spatulated positive mold has had to be balanced on glass and squeezed. The plastic material, which thus has oozed from the sides, has been formed up around the mold. After the plastic material coagulates it has been stripped from the positive mold and then thin leather has been wet molded and glued to the coagulated material to complete the appliance. Usually cowhide has been employed which will blend without wrinkles. The unit has then been trimmed on a lathe to conform to the inside of the shoe in which the appliance is to be used. The shoe, however, has had to be oversized or especially deep, and has had to be an oxford, because a pump is too narrow and shallow for the purpose. Because of the tedious manner of manufacture, this type of appliance is rather expensive; and the average person could not afford to buy it.

Another prior way of making a corrective appliance has been to buy a special shoe which has a base and a "cradle." The "cradle" has been filled with a mixture of latex and cork, or wood flour, and covered with monk's cloth all around. Then the monk's cloth has been cemented to the base. Then applicant has walked on it for one or two days. The cradle has then been separated from the base. The excess of monk's cloth has been removed. The monk's cloth has then been covered with sock lining, and then the cradle has been recemented to the base solidly. Again, however, considerable expense is involved; and the shoe is unattractive.

Still another prior method of making a corrective appliance has been to use a special shoe with a built-in cradle and a felt insert; to remove the felt insert and dip it in liquid latex, to replace it in the cradle, and to cover it with plastic wrapping material so that it will not stick, and then to have the patient stand in the shoe and rock forward. The plasic covering sheet has then been removed, and the felt allowed to air-dry for a day or so. Then the felt has been covered with a sock lining, and the shoe is ready for use.

All that these prior methods of making corrective appliances have taken considerable time of the patient and of the specialist, and have been costly. Then, too, conventional corrective shoes are heavy and clumsy. They are cumbersome and unattractive, and lack styling. They lack flexibility at the break of the shoe. Moreover, they are costly.

To improve the appearance of the shoe, sometimes a patient has a custom-molded shoe built for him or her. Here an impression of both the bottom and the top of the patient's foot is made and from these the factory makes a special last on which to make a shoe that exactly fits the patient's foot. This is, however, a still more expensive method of making an accommodative shoe.

In any event, the conventional corrective appliance has been difficult and expensive to make and involved much time and care. Furthermore, the conventional insert or "cradle" does not prevent pronation, that is, rolling in of the ankle bone, because the appliance is too shallow. For the same reason, in the case of people with splay foot, and people with bunions, the conventional cradle tends to rub against the abnormalities of the foot, causing irritation. The conventional "cradle," made of cork, furthermore, tends to crack at the break of the shoe; it absorbs water in rainy weather and laminates.

A primary object of the present invention is to provide a simple, fast, exact and economical method of fabricating custom-made, corrective or accommodative, foot-molded appliances in the doctor's office.

Another object of the present invention is to provide a corrective molded foot appliance for shoes which will hold a foot correctly in proper alignment and prevent pronation.

Another object of the invention is to provide a tray or liner for use in fabricating a molded foot appliance for a special corrective shoe as well as for a conventional roomy shoe.

Another object of the invention is to provide a molded foot appliance which is contoured in such a manner as to support only those areas above the sole of the foot that have a horizontal component of pressure.

Another object of the invention is to provide a tray or container which is shaped according to a proven and scientifically designed last having a broad "square" shank, a broad "walled" toe-box, outflare, and a narrow combination heel.

Another object of the invention is to provide a device of the character described which is interchangeable, and may be transferred from one pair of shoes to another.

Another object of the invention is to provide a foot container or tray from which the foot mold can be stripped at any time and which can be reused for other foot molds until perfect results are attained. This property enables the doctor to perfect his technic of molding without the necessity of buying a plurality of molding kits.

Another object of the invention is to provide a container which can be used as a medium for the fabrication of such prosthetics as crest pads and heel appliances an unlimited number of times, the finished (cured), appliance being simply stripped from the container and placed or cemented in a shoe.

Another object of the invention is to provide a device of the character described which is inexpensive, involves low cost of material, and a simple molding process.

Other objects of the invention are to provide a corrective tray or liner for shoes which will be flexible, which will not cause rigidity at the break of the shoe, which will retain its original shape after bending, but which will be rigid enough to support the heel, which is thin, which will not make shoes appear excessively wide, which is light in weight, which is not affected by changes in temperature, which is durable and will not break, crack, chip, warp, laminate, peel, or become thin with wear, which is water-proof, which is chemically inert and will not be affected by oil or other chemicals that a shoe may come in contact with, which is quiet and will not squeak in a shoe, and which may be easily trimmed, if necessary, with ordinary scissors.

Another object of the invention is to provide a corrective shoe which is attractive, inconspicuous, closed, light-weight, and flexible, and which is ingeniously designed and built around the tray or liner.

Other objects of the invention will be apparent hereinafter from the specification and from the recital of the appended claims.

In practicing the invention, a last, such as last 20 (Fig. 1), is first provided. This last is made for the patient's shoe size, but modified by the addition thereto of leather strips or other corrective material 21 in order to make allowance for the plastic liner which is subsequently to be inserted in the shoe. A shoe may be made over this modified last; and the last also serves as a form for manufacture of the corrective tray or liner. The liner can be used in the special shoe, to which reference will be made hereinafter, or it may be used in a standard shoe such as an oxford.

Figures 1, 2:
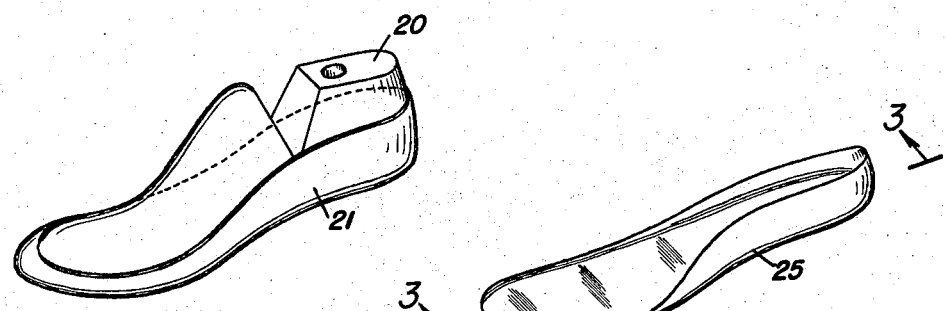
Fig. 1 is a perspective view of a standard shoe last indicating how it may be modified for making a plastic liner or container according to the present invention.
Fig. 2 is a perspective view of a plastic cradle or liner made according to one embodiment of this invention.
Figure 3:
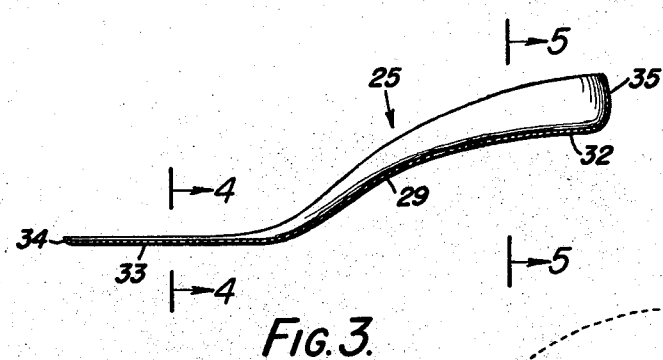
Fig. 3 is a longitudinal section through this plastic cradle or liner, the section being taken on the line 3—3 of Fig. 2 looking in the direction of the arrows.
Figure 4:
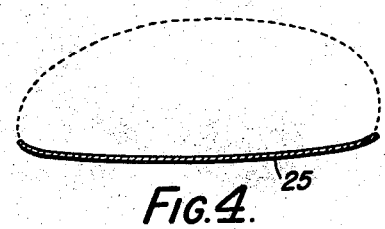
Fig. 4 is a section on the line 4—4 of Fig. 3 looking in the direction of the arrows.

To make the liner, a female mold is first made from the modified last 20. From the female mold, a male mold is then made but is reduced on the sides and the bottom to correspond to the thickness of the liner. This reduction may be effected by attaching leather or other corrective material to the female mold before making the male mold. Then a heated polyethylene sheet, or other suitable plastic, is placed between the male and female molds, to make the plastic tray or liner 25 (Fig. 2). Due to its manner of formation, the tray or liner is of uniform thickness, and its outer contour corresponds with the inner contour of a shoe made from the special last. The heel portion 32 of the sole of the tray will be above the toe portion 33 of this sole; and the shank 29 of the tray will be inclined upwardly from front to rear. The tray may also have a broad toe 34.

Figure 5:
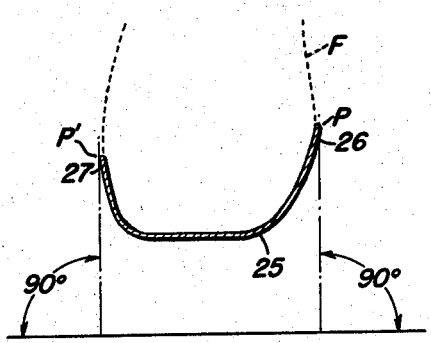
Fig. 5 is a section on the line 5—5 of Fig. 3 looking in the direction of the arrows.
Figure 6:
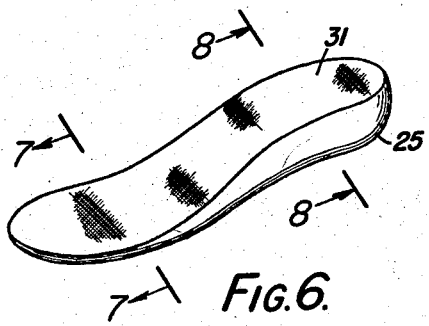
Fig. 6 is a perspective view showing the cradle or liner filled with a molding material and having monk's cloth or similar material covering the molding material, to provide a mold suitable to the user's foot.

The cradles heretofore used have been shallow. The tray or liner of this invention has a flange of varying height all around the periphery of its sole. The counter is lower at the outside than along the inside. The flange is cut at the heel so that inside 26 of the counter is higher than the outside 27 as shown in Fig. 5. This helps in correcting for pronation.

It is to be noted also that, as shown in Fig. 5, that the height of the flange around the tray 25 encloses only those areas of the foot F of the patient that have a horizontal component of thrust. Thus, the inside 26 of the counter is extended to a height to support all that portion of the inside of the patient's foot that is inclined to the vertical and that has therefore a horizontal component of thrust. The inside wall 26 of the heel portion of the tray therefore extends up to the point P where the inside of the patient's heel has a vertical direction. Similarly, the outside wall 27 of the heel portion of the tray or cradle extends up to the point P' where the outside of the patient's heel has a vertical direction.

The flange provides a semi-rigid extended counter and contributes to the rigidity of the counter of the shoe in which the tray or liner is placed.

Figure 7:
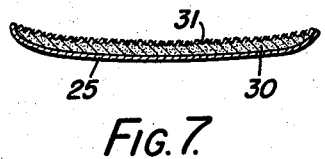
Fig. 7 is a section on the line 7—7 of Fig. 6 looking in the direction of the arrows.
Figure 8:
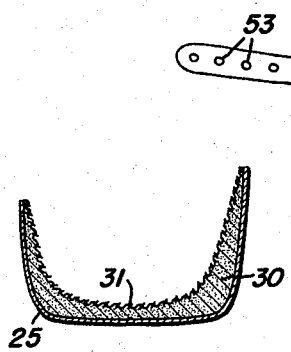
Fig. 8 is a section on the line 8—8 of Fig. 6 looking in the direction of the arrows.

To form a corrective foot mold, the plastic liner 25 is put into a shoe. This shoe may be the shoe with which the liner is intended to be used permanently for the life of the shoe, or it may be a shoe provided for the purpose simply of forming molds that are to be put into the patient's own shoes. If the patient has any excrescenses, the doctor cements a piece of felt of desired thickness and shape over the growth. A moldable mixture, such as a mixture of latex and cork, or wood flour, 30 (Figs. 7 and 8) is then spatulated into the tray or liner. This mixture is then covered with monk's cloth 31; and the patient's foot is then positioned by the doctor on top of the monk's cloth, to obtain an impression of the foot in its corrected position. The patient's foot is then gently removed from the mold.

The latex mixture is then allowed to coagulate. The tray or cradle with the hardened mold in its can then be removed from the shoe and the hardened plastic mold can be stripped from the tray and cemented in the patient's shoe, or the shoe can be sold with the tray or liner in it. The mold conforms to all of the irregularities of the patient's foot.

My new tray or liner has a semi-rigid extended counter, and shank. It therefore affords heel control while providing enough flexibility to flex with the step. It is flexible enough to retain its original shape despite bending. The deep cupped heel 35 of the tray allows for better placement of the heel of the patient. The counter helps in holding the foot in its proper position. The heel cup is deep enough to maintain proper foot alignment. It is so thin that it does not increase appreciably the bulk of the shoe in which it is used, or make that shoe excessively wide. It is featherweight. It is easily separable from the mold for correction or adjustments of the latter. If, for instance, the doctor for any reason fails to make a satisfactory foot mold on his first attempt, the rubber-dough filler can be stripped from the tray, and the latter can be re-used until a correct mold is obtained. This property of the polyethylene plastic tray enables the doctor to perfect his technique of molding without having to buy additional trays.

The previous cradle constructions were expensive and had to be made of materials that had undesirable physical characteristics. The tray of the present invention is light-weight, flexible, attractive, inconspicuous and much less expensive. The new tray or liner can be made of various sizes of lengths and widths. The doctor (podiatrist) can manufacture a suitable corrective or accommodative mold for a patient in his own office in a matter of minutes, avoiding laboratory fees, and avoiding the waiting period for delivery.

The tray of the present invention is durable; it will not break, chip, laminate, or wrap. It is waterproof; it is chemically inert and will not be affected by oil or other chemicals with which the shoe may come into contact. When used in a shoe with the foot mold, it prevents the foot mold from shrinking. It is quiet; it will not squeak in a shoe.

As previously indicated the tray of the present invention can be used to make corrective or accommodative foot molds for a pair of shoes previously owned by the patient. In this case, the tray is put in a suitable shoe and the mold is shaped in the tray as described above. Then, after hardening, the mold is stripped from the tray and put in the patient's shoe. The doctor can then use the tray in making other foot molds for other patients.

In some cases the patient may want or may need a complete corrective shoe.

Figure 9:
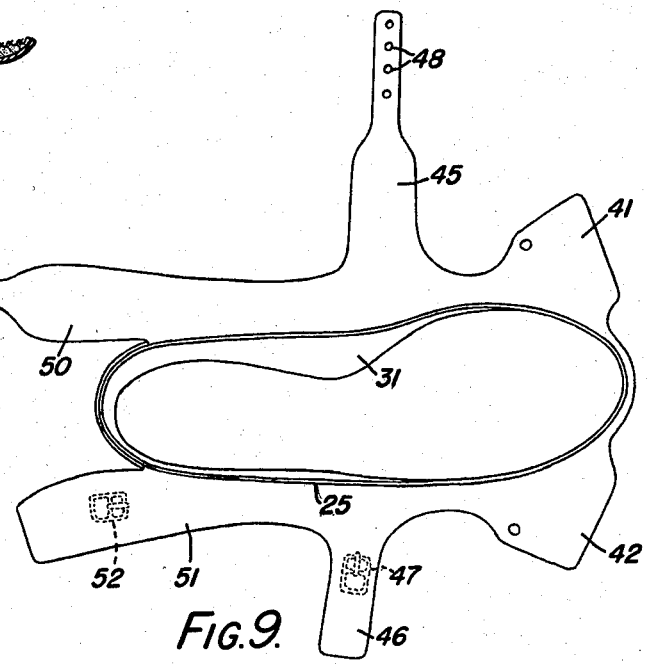
Fig. 9 is a top plan view showing a shoe made according to one embodiment of this invention fully open, and illustrating its structure.
Figure 10:
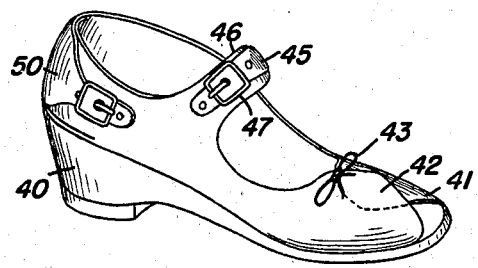
Figs. 10, 11 and 12 are a perspective view, a plan view, and a rear elevation, respectively, of this shoe closed about the plastic liner.
Figure 11:
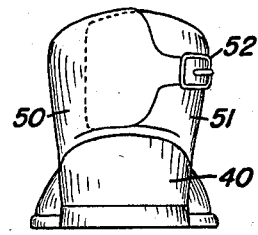
Figure 12:
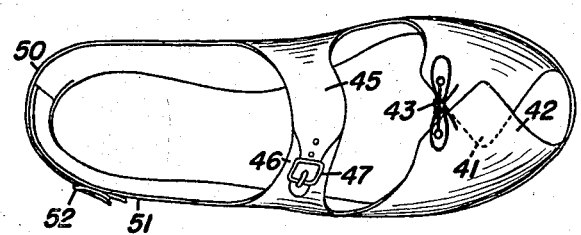

One of the features of the present invention is the provision of a corrective shoe which is stylish in appearance and not clumsy as have been previous designs of corrective shoes. The shoe (Figs. 9 to 12) may be made with a distinct heel 40 or the heel may be of so-called "wedgie" shape. The upper of the shoe may be completely opened to permit easy insertion into or removal of the tray 25 from the shoe. It has at its front two flaps 41 and 42 which can be laced or tied together by a lace or tie 43. Across the instep are a pair of straps 45 and 46. The latter carries a buckle 47 for cooperation with the holes 48 in strap 45. Its heel is closed by a pair of straps 50 and 51, the latter carrying a buckle 52 which cooperates with holes 53 in strap 50. The shoe is shown fully open in Fig. 9, and closed in Figs. 10, 11 and 12. The shoe is closed at the heel and is neat in appearance. Moreover, the foot mold contained in it cannot be seen from the outside, and is, therefore, inconspicuous.

While the invention has been described in connection with a specific embodiment thereof, and a particular use therefor, it will be understood that it is capable of further application, and this application is intended to cover any variations, uses, or adaptations of the invention, following, in general, the principles of the invention and including such departures from the present disclosure as come within known or customary practice in the art to which the invention pertains, and as may be applied to the essential fetures hereinbefore set forth, and as fall within the scope of the invention, or the limits of the appended claims.

Having thus described my invention, what I claim is:

1. A removable and reusable tray for use in making a corrective foot-molded appliance for a shoe, said tray comprising a container consisting of a single piece of thin, flexible plastic material from which a foot-molded appliance can be stripped, said container being shaped externally and internally to the inside shape of a shoe so that the container can be inserted inside a shoe to hold a moldable material for making a dynamic impression of a foot thereby to form the foot-molded appliance, said container having a sole portion, a heel portion, and a shank portion connecting said sole and heel portions, and said container having a flange around the heel portion thereof and along the sides of said shank portion, the sole, heel and shank portions of the container and said flange being of the same thickness and all being of uniform thickness throughout.

2. A removable and reusable tray as claimed in claim 1 wherein the flange varies in height around the heel portion of the container, and wherein the flange is of greater height at the inside side of the container than at the outside side thereof.

3. A removable and reusable tray as claimed in claim 2 wherein the height of the flange at any one point is such as to support and enclose, during making of the impression, only those areas of the patient's foot which exert a component of horizontal thrust in walking.

References Cited in the file of this patent

UNITED STATES PATENTS

| | | |
|---|---|---|
| 865,836 | Wedekind | Sept. 10, 1907 |
| 1,111,361 | Carr | Sept. 22, 1914 |
| 2,156,086 | Hack | Apr. 25, 1939 |
| 2,200,068 | Levin | May 7, 1940 |
| 2,417,852 | Zerkle | Mar. 25, 1947 |
| 2,530,737 | Sherwin | Nov. 21, 1950 |
| 2,734,285 | Levitt | Feb. 14, 1956 |